US008538680B2

(12) United States Patent
Yu et al.

(10) Patent No.: US 8,538,680 B2
(45) Date of Patent: Sep. 17, 2013

(54) REAL-TIME NAVIGATION ELECTRONIC DEVICE AND METHOD BASED ON DETERMINING CURRENT TRAFFIC RULE INFORMATION, AND CORRESPONDING COMPUTER READABLE STORAGE MEDIUM FOR STORING PROGRAM THEREOF

(75) Inventors: Chia-Chen Yu, Taoyuan (TW); Ching-Hao Lai, Taichung (TW)

(73) Assignee: Institute for Information Industry, Taipei (TW)

( * ) Notice: Subject to any disclaimer, the term of this patent is extended or adjusted under 35 U.S.C. 154(b) by 212 days.

(21) Appl. No.: 13/158,750

(22) Filed: Jun. 13, 2011

(65) Prior Publication Data
US 2012/0265435 A1    Oct. 18, 2012

(30) Foreign Application Priority Data

Apr. 14, 2011    (TW) ............................. 100113002 A

(51) Int. Cl.
*G01C 21/00*    (2006.01)
*G01C 21/26*    (2006.01)
*G01C 21/34*    (2006.01)
*G08G 1/0969*    (2006.01)
*G09B 29/00*    (2006.01)
*G09B 29/10*    (2006.01)

(52) U.S. Cl.
USPC ........... 701/408; 701/409; 701/411; 701/443; 701/532; 701/533; 382/104

(58) Field of Classification Search
None
See application file for complete search history.

(56) References Cited

U.S. PATENT DOCUMENTS

| | | | | |
|---|---|---|---|---|
| 6,018,697 A | * | 1/2000 | Morimoto et al. | 701/411 |
| 6,587,786 B1 | * | 7/2003 | La Rue | 701/443 |
| 8,150,216 B2 | * | 4/2012 | Retterath et al. | 382/305 |
| 2007/0061066 A1 | * | 3/2007 | Bruelle-Drews | 701/200 |

FOREIGN PATENT DOCUMENTS

| | | | |
|---|---|---|---|
| EP | 2208967 A1 | * | 7/2010 |
| JP | 2006038558 A | * | 2/2006 |

* cited by examiner

*Primary Examiner* — Helal A Algahaim
*Assistant Examiner* — Edward Torchinsky
(74) *Attorney, Agent, or Firm* — McClure, Qualey & Rodack, LLP

(57) ABSTRACT

A real-time navigation electronic device based on determining current traffic rule information includes a positioning unit, a user interface, an information detecting-and-generating unit and a processing unit. The information detecting-and-generating unit detects and generates information for determining real-time traffic rule. The processing unit generates a navigation route according to the destination and the present position. The processing unit receives the information for determining real-time traffic rule. The processing unit determines if the information for determining real-time traffic rule conflicts with the navigation route or makes the navigation route not the quickest route. The processing unit re-generates the navigation route according to the destination, the present position and the information for determining real-time traffic rule when the information for determining real-time traffic rule conflicts with the navigation route or makes the navigation route not the quickest route. The processing unit outputs the navigation route.

12 Claims, 2 Drawing Sheets

REAL-TIME NAVIGATION ELECTRONIC DEVICE AND METHOD BASED ON DETERMINING CURRENT TRAFFIC RULE INFORMATION, AND CORRESPONDING COMPUTER READABLE STORAGE MEDIUM FOR STORING PROGRAM THEREOF

RELATED APPLICATIONS

This application claims priority to Taiwan Application Serial Number 100113002, filed Apr. 14, 2011, which is herein incorporated by reference.

BACKGROUND

1. Technical Field

The present invention relates to a navigation electronic device, a navigation method and a computer readable storage medium for storing thereof. More particularly, the present invention relates to a real-time navigation electronic device based on determining current traffic rule information, a real-time navigation method based on determining current traffic rule information and a computer readable storage medium for storing thereof.

2. Description of Related Art

The Global Positioning System (GPS) is a space-based global navigation satellite system (GNSS) that provides location and time information and can be utilized for positioning. In early days, GPS was only available for military purpose, such as precisely positioning fighter aircrafts, naval vessels, vehicles, staffs, fighting targets. Nowadays, GPS is available for civilian for positioning. GPS, which is a technology combining the satellite technology with the communication technology, is developed by many people, can be utilized to provide precise messages about the speed, the time, the direction and the distance, and is applied in many different applications.

In prior art, GPS is combined with Geographic Information System (GIS) to provide the geographical position or provide the navigation function. However, the navigation route generated according to the Geographic Information un-updated may lead users to a path unable to be passed through. For example, the navigation route may suggest turning left at a left-turn prohibited intersection. Besides, there may be some road situations (such as car accidents or road closed), which may prevent users from driving as the navigation route suggests.

Above all, there is a need to generate or plan the navigation route according to the real-time road situation.

SUMMARY

According to one embodiment of this invention, a real-time navigation electronic device based on determining current traffic rule information is provided. The real-time navigation electronic device re-generates the navigation route when the information for determining the real-time traffic rule conflicts with the navigation route or makes the navigation route not the quickest route. The real-time navigation electronic device based on determining current traffic rule information includes a positioning unit, a user interface, an information detecting-and-generating unit and a processing unit. The processing unit is electrically connected to the positioning unit, the user interface and the information detecting-and-generating unit. The information detecting-and-generating unit detects and generates information for determining real-time traffic rule. The processing unit includes a destination receiving module, a present-position obtaining module, a route generating module, an information receiving module, a determining module, a triggering module, an output module, and an update module. The destination receiving module receives a destination through the user interface. The present-position obtaining module obtains a present position through the positioning unit. The route generating module generates a navigation route according to the destination and the present position. The information receiving module receives the information for determining real-time traffic rule. The determining module determines if the information for determining real-time traffic rule conflicts with the navigation route or makes the navigation route not the quickest route. The triggering module triggers the route generating module to re-generate the navigation route according to the destination, the present position and the information for determining real-time traffic rule when the information for determining real-time traffic rule conflicts with the navigation route or makes the navigation route not the quickest route. The output module outputs the navigation route. When the information for determining real-time traffic rule conflicts with the navigation route or makes the navigation route not the quickest route, the update module may update the preset information for determining traffic rule in the storage unit according to the actual information for determining real-time traffic rule.

According to another embodiment of this invention, a real-time navigation method based on determining current traffic rule information is provided. In the real-time navigation method, the navigation route is re-generated when the information for determining real-time traffic rule conflicts with the navigation route or makes the navigation route not the quickest route. The real-time navigation method based on determining current traffic rule information may take the form of a computer program product stored on a computer-readable storage medium having computer-readable instructions embodied in the medium. The real-time navigation method based on determining current traffic rule information includes the following steps: a destination is received. A present position is obtained. A navigation route is generated according to the destination and the present position. Information for determining real-time traffic rule is detected and generated. Determine if the information for determining real-time traffic rule conflicts with the navigation route or makes the navigation route not the quickest route. The navigation route is re-generated according to the destination, the present position and the information for determining real-time traffic rule when the information for determining real-time traffic rule conflicts with the navigation route or makes the navigation route not the quickest route. The navigation route is output.

Above all, when the present road situation conflicts with the navigation route or makes the navigation route not the quickest route, the navigation route can be re-generated (re-planned) immediately, which can avoid that the navigation route is not the quickest route or leads users to the path which can not be passed through.

These and other features, aspects, and advantages of the present invention will become better understood with reference to the following description and appended claims. It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiments, with reference made to the accompanying drawings as follows.

DETAILED DESCRIPTION

Figure 1:
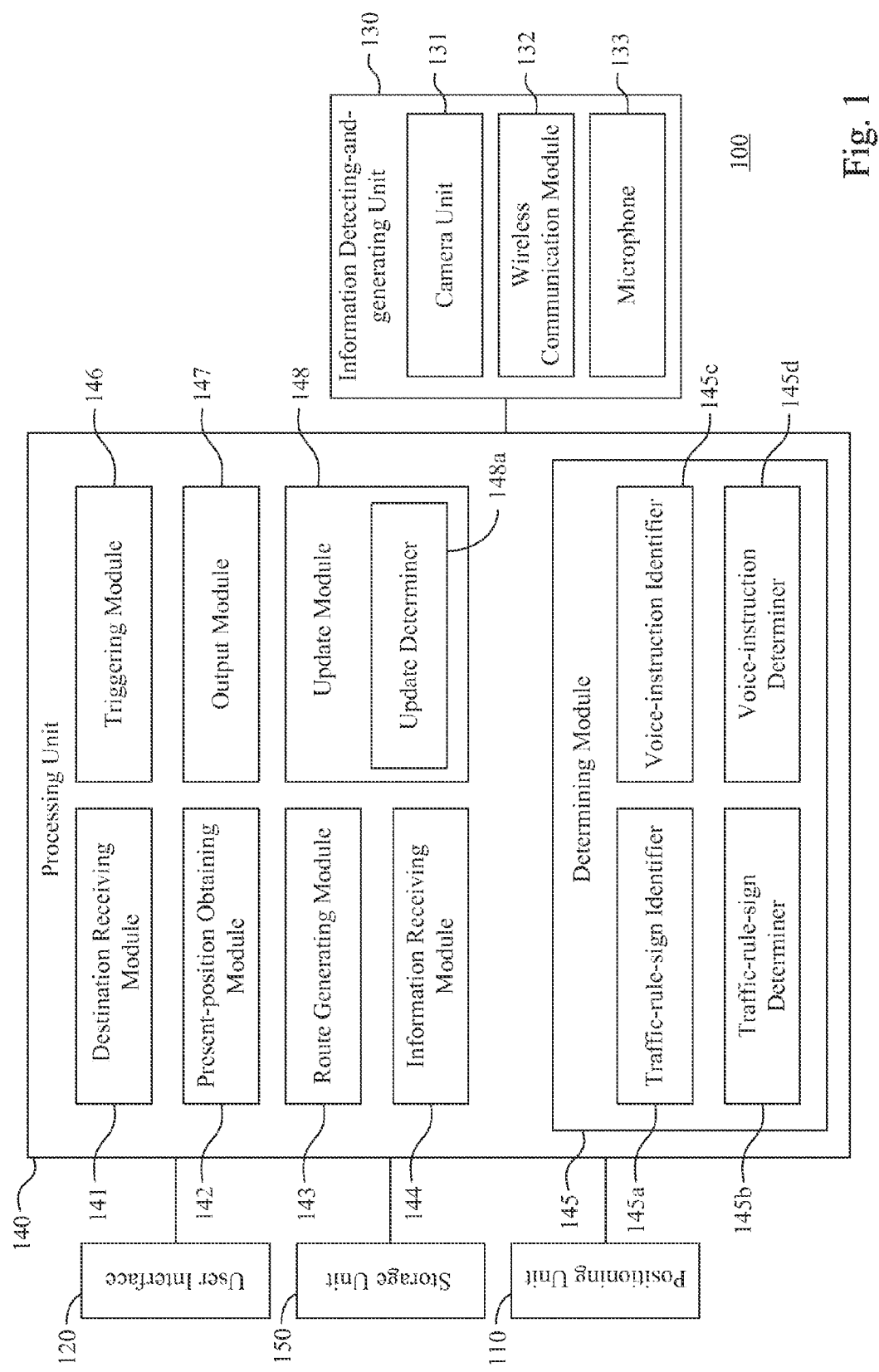
FIG. 1 is a block diagram of a real-time navigation electronic device based on determining current traffic rule information according to one embodiment of this invention.

Reference will now be made in detail to the present embodiments of the invention, examples of which are illustrated in the accompanying drawings. Wherever possible, the same reference numbers are used in the drawings and the description to refer to the same or like parts.

FIG. 1 is a block diagram of a real-time navigation electronic device based on determining current traffic rule information according to one embodiment of this invention. The real-time navigation electronic device re-generates the navigation route when the information for determining real-time traffic rule conflicts with the navigation route or makes the navigation route not the quickest route.

The real-time navigation electronic device based on determining current traffic rule information 100 includes a positioning unit 110, a user interface 120, an information detecting-and-generating unit 130 and a processing unit 140. The processing unit 140 is electrically connected to the positioning unit 110, the user interface 120 and the information detecting-and-generating unit 130 respectively.

The positioning unit 110 may utilize a Global Positioning System (GPS), an Assisted Global Positioning System (AGPS), a Base Station Positioning System or any other positioning method to generate a present position. The user interface 120 may be a mouse, a keyboard, at least one button, a touch screen, a Graphical User Interface (GUI) or any other user interface.

The information detecting-and-generating unit 130 detects and generates information for determining real-time traffic rule. The processing unit 140 includes a destination receiving module 141, a present-position obtaining module 142, a route generating module 143, an information receiving module 144, a determining module 145, a triggering module 146 and an output module 147. The destination receiving module 141 receives a destination through the user interface 120. The present-position obtaining module 142 obtains the present position through the positioning unit 110. The route generating module 143 generates a navigation route according to the destination and the present position. In one embodiment of this invention, the real-time navigation electronic device based on determining current traffic rule information 100 may further include a storage unit 150, which is electrically connected to the processing unit 140. The storage unit 150 may be a flash memory, a floppy disk, a hard disk, a USB disk, a network database or any other storage unit. The storage unit 150 stores several preset information for determining traffic rule. Then, the route generating module 143 searches the preset information for determining traffic rule stored in the storage unit 150 according to the destination and the present position to generate the navigation route.

The information receiving module 144 receives the information for determining real-time traffic rule from the information detecting-and-generating unit 130. The determining module 145 determines if the information for determining real-time traffic rule conflicts with the navigation route or makes the navigation route not the quickest route. When the information for determining real-time traffic rule conflicts with the navigation route or makes the navigation route not the quickest route, the triggering module 146 triggers the route generating module 143 to re-generate the navigation route according to the destination, the present position and the information for determining real-time traffic rule. The output module 147 outputs the navigation route. Therefore, when the information for determining real-time traffic rule conflicts with the navigation route or makes the navigation route not the quickest route, the navigation route can be re-generated (re-planned), which can avoid the navigation route that leads users to the path which can not be passed through.

In one embodiment of this invention, the information detecting-and-generating unit 130 may photograph an image to be taken as the information for determining real-time traffic rule. Hence, the information detecting-and-generating unit 130 may include a camera unit 131, and the determining module 145 may include a traffic-rule-sign identifier 145a and a traffic-rule-sign determiner 145b. The camera unit 131 photographs a front image, and the front image is added to the information for determining real-time traffic rule. The traffic-rule-sign identifier 145a captures and identifies a traffic-rule sign from the front image of the information for determining real-time traffic rule. Wherein, the traffic-rule-sign identifier 145a may determine if there is a traffic-rule sign, such as a left-turn prohibition sign, a right-turn prohibition sign, a no u-turn sign, a road work ahead sign, a traffic accident sign, a vehicle type restricted sign, a sign representing that there is a train crossing, a one-way sign or any other traffic-rule sign, which may conflict with the navigation route or make the navigation route not the quickest route. The traffic-rule-sign determiner 145b determines if the traffic-rule sign conflicts with the navigation route or makes the navigation route not the quickest route. For example, when the navigation route suggests turning left but the identified traffic-rule sign is the left-turn prohibition sign, the traffic-rule-sign determiner 145b determines that the traffic-rule sign (left-turn prohibition sign) conflicts with the navigation route. In another embodiment of this invention, when the traffic-rule-sign identifier 145a identifies a traffic-rule sign for lowering the speed limit, the traffic-rule-sign determiner 145b may determine that the traffic-rule sign for lowering the speed limit makes the navigation route not the quickest route, and the triggering module 146 triggers the route generating module 143 to re-generate a substitution navigation route with higher speed limit, which can avoid longer driving time period caused by lowering the speed limit. In other embodiments, the traffic-rule-sign determiner 145b may make the determination according to the navigation route or the traffic-rule sign identified, which should not be limited in this disclosure. Therefore, it can avoid the navigation route leading users to the path, which conflicts with the traffic-rule sign or is no longer the quickest route path. Even if the navigation information stored in the real-time navigation electronic device based on determining current traffic rule information 100 conflicts with the traffic-rule sign or the traffic-rule sign ahead makes the navigation route not the quickest route, the navigation route can still be amended immediately.

In another embodiment of this invention, users can input the information for determining real-time traffic rule utilizing their voice. Hence, the information detecting-and-generating unit 130 may include a microphone 133, and the determining module 145 may include a voice-instruction identifier 145c and a voice-instruction determiner 145d. The voice-instruction identifier 145c receives a voice signal through the microphone 133 to be taken as the information for determining real-time traffic rule. The voice-instruction identifier 145c identifies a voice instruction, which is taken as the information for determining real-time traffic rule, according to the voice signal. The voice-instruction determiner 145d determines if the voice instruction conflicts with the navigation route or makes the navigation route not the quickest route. For example, a user may speak a voice instruction "no left turn" to the microphone 133. Hence, when the navigation route suggests turning left but the voice-instruction identifier 145c identifies the voice instruction "no left turn", the voice-instruction determiner 145d determines that the voice instruction "no left turn" conflicts with the navigation route. In other embodiments, the voice-instruction determiner 145d may make the determination according to the navigation route or the voice instruction identified, which should not be limited in this disclosure. Therefore, when users don't want to or can't drive as the navigation route suggests, they can speak voice instructions.

In another embodiment of this invention, the information detecting-and-generating unit 130 may further include a wireless communication module 132. Hence, the wireless communication module 132 can receive and generate the information for determining real-time traffic rule through a wireless communication interface to provide to the determining module 145. Wherein, the wireless communication interface may be Dedicated Short Range Communication (DSRC), wireless network or any other wireless communication interface. Therefore, the information for determining real-time traffic rule can be received from other devices (such as navigation devices installed on other vehicles, road side units or any other electrical devices capable of transmitting the information for determining real-time traffic rule) through the wireless communication interface, which can achieve Vehicle to Vehicle (V2V) communication, Vehicle to Infrastructure (V2I) communication or Vehicle to Roadside (V2R) communication. Besides, when the information for determining real-time traffic rule conflicts with the navigation route or makes the navigation route not the quickest route, the wireless communication module 132 may transmit the information for determining real-time traffic rule to other devices (such as navigation devices installed on other vehicles, road side units or any other electrical devices capable of transmitting the information for determining real-time traffic rule) through the wireless communication interface. Therefore, even if other device can't obtain the information for determining real-time traffic rule according to images or voice instructions, the determining module 145 can do the determination according to the information received by the wireless communication module 132.

In addition, the preset information for determining traffic rule in the storage unit 150 can be updated for the determination next time. Hence, the processing unit 140 may further include an update module 148. When the information for determining real-time traffic rule conflicts with the navigation route or makes the navigation route not the quickest route, the update module 148 updates the preset information for determining traffic rule in the storage unit 150 according to the actual information for determining real-time traffic rule. Therefore, when driving through the same place, navigation routes can be generated according to the updated information, which can reduce the probability that the conflict occurs or the generated navigation route is not the quickest route.

Besides, the update module 148 may include an update determiner 148a. The update determiner 148a determines if the information for determining real-time traffic rule represents a temporary road situation (such as a road work ahead situation, a sign representing that there is a train crossing or other temporary road situation). When the information for determining real-time traffic rule does not represent the temporary road situation, the update determiner 148a triggers the update module 148 to update the preset information for determining traffic rule in the storage unit 150 according to the information for determining real-time traffic rule. When the information for determining real-time traffic rule represents the temporary road situation, the update determiner 148a stops the update of the update module 148. Therefore, the preset information for determining traffic rule in the storage unit won't be updated when the temporary road situation occurs.

Figure 2:
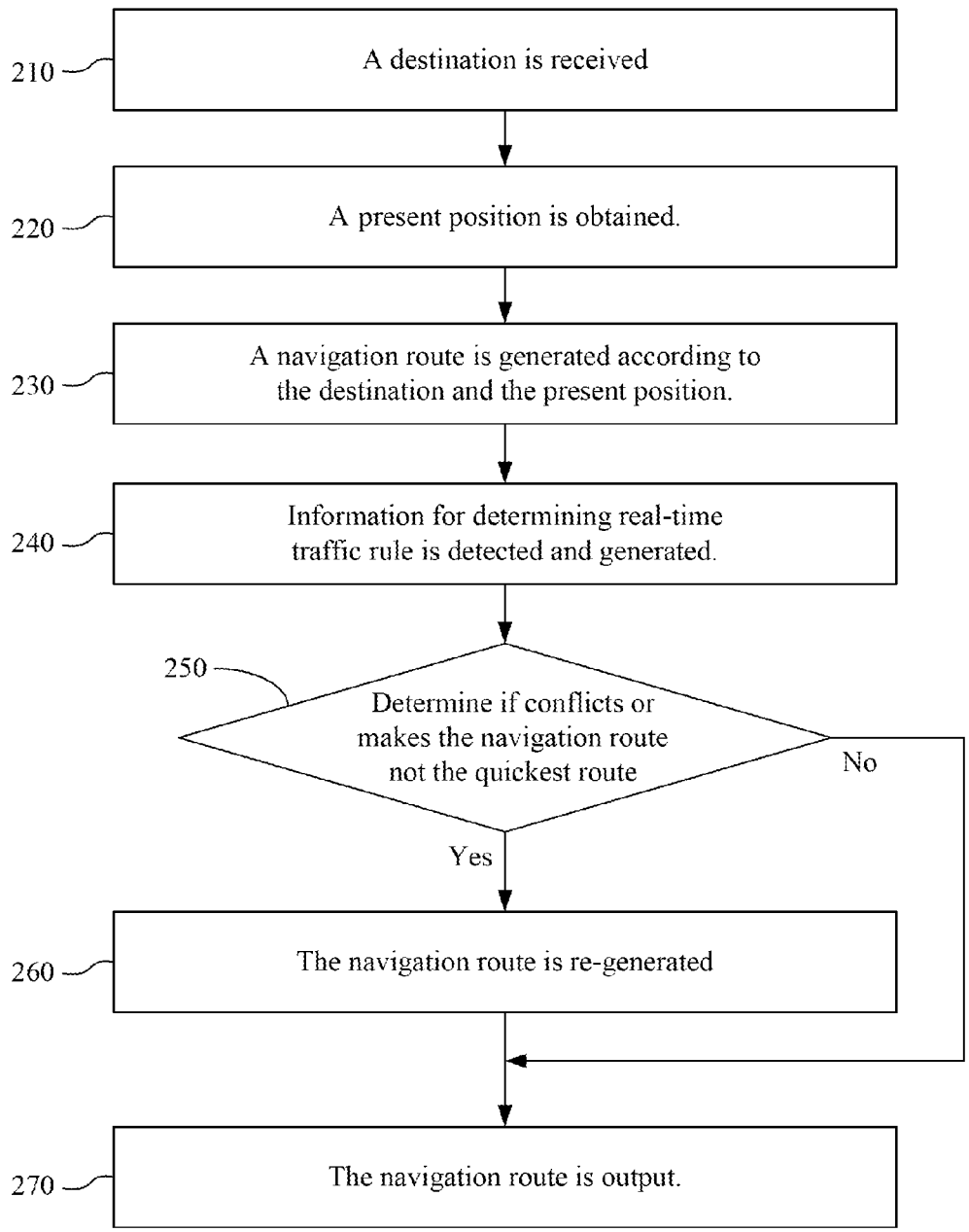
FIG. 2 is a flow diagram of a real-time navigation method based on determining current traffic rule information according to another embodiment of this invention.

FIG. 2 is a flow diagram of a real-time navigation method based on determining current traffic rule information according to another embodiment of this invention. In the real-time navigation method, the navigation route is re-generated when the information for determining real-time traffic rule conflicts with the navigation route or makes the navigation route not the quickest route. The real-time navigation method may take the form of a computer program product stored on a computer-readable storage medium having computer-readable instructions embodied in the medium. Any suitable storage medium may be used including non-volatile memory such as read only memory (ROM), programmable read only memory (PROM), erasable programmable read only memory (EPROM), and electrically erasable programmable read only memory (EEPROM) devices; volatile memory such as SRAM, DRAM, and DDR-RAM; optical storage devices such as CD-ROMs and DVD-ROMs; and magnetic storage devices such as hard disk drives and floppy disk drives.

The real-time navigation method based on determining current traffic rule information 200 includes the following steps:

In step 210, a destination is received. Wherein, the destination can be received (step 210) through a mouse, a keyboard, at least one button, a touch screen, a GUI or any other user interface. In other embodiments, the destination can be received through other methods, which should not be limited in this disclosure.

In step 220, a present position is obtained. Wherein, the present position can be received (step 220) utilizing a Global Positioning System (GPS), an Assisted Global Positioning System (AGPS), a Base Station Positioning System or any other positioning method. In other embodiments of this invention, the present position can be obtained through other methods, which should not be limited in this disclosure.

In step 230, a navigation route is generated according to the destination and the present position. In one embodiment of step 230, the navigation route may be generated by searching preset information for determining traffic rule stored in a storage unit according to the destination and the present position to generate. In other embodiments of this invention, the navigation route can be generated or planned utilizing other methods, which should not be limited in this disclosure.

In step 240, information for determining real-time traffic rule is detected and generated.

In step 250, determine if the information for determining real-time traffic rule conflicts with the navigation route or makes the navigation route not the quickest route.

In step 270, when the information for determining real-time traffic rule does not conflict with the navigation route and does not make the navigation route not the quickest route, the navigation route is output.

In step 260, when the information for determining real-time traffic rule conflicts with the navigation route or makes the navigation route not the quickest route, the navigation route is re-generated according to the destination, the present position and the information for determining real-time traffic rule, and the re-generated navigation route is output (step 270). Therefore, when the information for determining real-time traffic rule conflicts with the navigation route or makes the navigation route not the quickest route, the navigation route can be re-generated (re-planned), which can avoid the navigation route is not the quickest route or leads users to the path which can not be passed through.

In one embodiment of this invention, the information for determining real-time traffic rule may be detected and generated according to a photographed front image. Then, the front image is added to the information for determining real-time traffic rule. Hence, the step of determining if the information for determining real-time traffic rule conflicts with the navigation route or makes the navigation route not the quickest route (step 250) may include the following steps: a traffic-rule sign is captured and identified from the front image of the information for determining real-time traffic rule, and determine if the traffic-rule sign conflicts with the navigation route or makes the navigation route not the quickest route. Wherein, a traffic-rule sign, such as a left-turn prohibition sign, a right-turn prohibition sign, a no u-turn sign, a road work ahead sign, a traffic accident sign, a vehicle type restricted sign, a sign representing that there is a train crossing, a one-way sign or any other traffic-rule sign, which may conflict with the navigation route or make the navigation route not the quickest route, may be captured and identified for the determination in step 250. Therefore, it can avoid the navigation route leading users to the path, which conflicts with the traffic-rule sign or is no longer the quickest route path. Even if the generated navigation route conflicts with the traffic-rule sign or the traffic-rule sign ahead makes the navigation route not the quickest route, the navigation route can still be amended immediately.

In another embodiment of step 240, the information for determining real-time traffic rule may be detected and generated according to a voice signal received. Hence, the step of determining if the information for determining real-time traffic rule conflicts with the navigation route or makes the navigation route not the quickest route (step 250) may include the following steps: a voice instruction is identified according to the voice signal, and determine if the voice instruction conflicts with the navigation route or makes the navigation route not the quickest route. Therefore, when users don't want to or can't drive as the navigation route suggests, they can speak voice instructions.

In another embodiment of step 240, the information for determining real-time traffic rule may be received and generated through a wireless communication interface for determination in step 250. Wherein, the wireless communication interface may be DSRC, wireless network or any other wireless communication interface. Therefore, the information for determining real-time traffic rule can be received from other devices (such as navigation devices installed on other vehicles, road side units or any other electrical devices capable of transmitting the information for determining real-time traffic rule) through the wireless communication interface, which can achieve V2V communication, V2I communication or V2R communication. Besides, when step 250 determines that the information for determining real-time traffic rule conflicts with the navigation route or makes the navigation route not the quickest route, the information for determining real-time traffic rule may be transmitted to other devices (such as navigation devices installed on other vehicles, road side units or any other electrical devices capable of transmitting the information for determining real-time traffic rule) through the wireless communication interface. Therefore, even if other devices can't obtain the information for determining real-time traffic rule according to images or voice instructions, the determination in step 250 can be made according to the information received through the wireless communication interface.

Besides, the real-time navigation method based on determining current traffic rule information 200 may further include: when the information for determining real-time traffic rule conflicts with the navigation route or makes the navigation route not the quickest route, the preset information for determining traffic rule in the storage unit is updated according to the information for determining real-time traffic rule. Therefore, when driving through the same place, navigation routes can be generated according to the updated information, which can reduce the probability that the conflict occurs or the generated navigation route is not the quickest route.

Before the preset information for determining traffic rule in the storage unit is updated, if the information for determining real-time traffic rule represents a temporary road situation (such as a road work ahead situation, a sign representing that there is a train crossing or other temporary road situation) may be determined. When the information for determining real-time traffic rule does not represent the temporary road situation, the preset information for determining traffic rule in the storage unit is updated according to the information for determining real-time traffic rule. When the information for determining real-time traffic rule represents the temporary road situation, the preset information for determining traffic rule in the storage unit may not be updated. Therefore, the preset information for determining traffic rule in the storage unit won't be updated when the temporary road situation occurs.

Above all, when the present road situation, which is determined according to the information for determining real-time traffic rule, conflicts with the navigation route or makes the navigation route not the quickest route, the navigation route can be re-generated (re-planned) immediately, which can avoid that the navigation route is not the quickest route or leads users to the path which can not be passed through.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A real-time navigation electronic device based on determining current traffic rule information comprising:
   a positioning unit;
   a user interface;
   a storage unit electrically connected to the processing unit and for storing several preset information for determining traffic rule;
   an information detecting-and-generating unit for detecting and generating information for determining real-time traffic rule; and
   a processing unit electrically connected to the positioning unit and the user interface, wherein the processing unit comprises:
   a destination receiving module for receiving a destination through the user interface;
   a present-position obtaining module for obtaining a present position through the positioning unit;

a route generating module for generating a navigation route according to the destination and the present position, wherein the route generating module searches the preset information for determining traffic rule stored in the storage unit according to the destination and the present position to generate the navigation route;

an information receiving module for receiving the information for determining real-time traffic rule;

a determining module for determining if the information for determining real-time traffic rule conflicts with the navigation route or makes the navigation route not the quickest route;

a triggering module for triggering the route generating module to re-generate the navigation route according to the destination, the present position and the information for determining real-time traffic rule when the information for determining real-time traffic rule conflicts with the navigation route or makes the navigation route not the quickest route;

an output module for outputting the navigation route; and an update module for updating the preset information for determining traffic rule in the storage unit according to the actual information for determining real-time traffic rule when the information for determining real-time traffic rule conflicts with the navigation route or makes the navigation route not the quickest route, wherein the update module comprises:

an update determiner for determining if the information for determining real-time traffic rule represents a temporary road situation, and when the information for determining real-time traffic rule does not represent the temporary road situation, updating the preset information for determining traffic rule in the storage unit according to the information for determining real-time traffic rule, wherein when the information for determining real-time traffic rule represents the temporary road situation, the update determiner stops the update of the update module.

2. The real-time navigation electronic device based on determining current traffic rule information of claim 1, wherein:
the information detecting-and-generating unit comprises a camera unit for photographing a front image, and the front image is added to the information for determining real-time traffic rule; and
the determining module comprises:
a traffic-rule-sign identifier for capturing and identifying a traffic-rule sign from the front image of the information for determining real-time traffic rule; and
a traffic-rule-sign determiner for determining if the traffic-rule sign conflicts with the navigation route or makes the navigation route not the quickest route.

3. The real-time navigation electronic device based on determining current traffic rule information of claim 1, wherein:
the information detecting-and-generating unit comprises a microphone; and
the determining module comprises:
a voice-instruction identifier for receiving a voice signal through the microphone to be taken as the information for determining real-time traffic rule and identifying a voice instruction according to the voice signal; and
a voice-instruction determiner for determining if the voice instruction conflicts with the navigation route or makes the navigation route not the quickest route.

4. The real-time navigation electronic device based on determining current traffic rule information of claim 1, wherein the information detecting-and-generating unit comprises:
a wireless communication module for receiving and generating the information for determining real-time traffic rule through a wireless communication interface.

5. The real-time navigation electronic device based on determining current traffic rule information of claim 1 further comprising:
a wireless communication module for transmitting the information for determining real-time traffic rule through a wireless communication interface when the information for determining real-time traffic rule conflicts with the navigation route or makes the navigation route not the quickest route.

6. A real-time navigation method based on determining current traffic rule information comprising:
receiving a destination utilizing a processing unit;
obtaining a present position utilizing the processing unit;
generating a navigation route according to the destination and the present position utilizing the processing unit, wherein the navigation route is generated by searching preset information for determining traffic rule stored in a storage unit according to the destination and the present position to generate;
detecting and generating information for determining real-time traffic rule utilizing an information detecting-and-generating unit;
determining if the information for determining real-time traffic rule conflicts with the navigation route or makes the navigation route not the best quickest route utilizing the processing unit;
re-generating the navigation route according to the destination, the present position and the information for determining real-time traffic rule utilizing the processing unit when the information for determining real-time traffic rule conflicts with the navigation route or makes the navigation route not the quickest route;
outputting the navigation route utilizing the processing unit; and
updating the preset information for determining traffic rule in the storage unit according to the information for determining real-time traffic rule utilizing the processing unit when the information for determining real-time traffic rule conflicts with the navigation route or makes the navigation route not the quickest route, wherein the step of updating the preset information for determining traffic rule in the storage unit comprises:
determining if the information for determining real-time traffic rule represents a temporary road situation utilizing the processing unit;
updating the preset information for determining traffic rule in the storage unit according to the information for determining real-time traffic rule utilizing the processing unit when the information for determining real-time traffic rule does not represent the temporary road situation; and
stopping updating the preset information for determining traffic rule in the storage unit according to the information for determining real-time traffic rule utilizing the processing unit when the information for determining real-time traffic rule represents the temporary road situation.

7. The real-time navigation method based on determining current traffic rule information of claim 6, wherein:
the step of generating the information for determining real-time traffic rule comprises:

photographing a front image utilizing a camera unit of the information detecting-and-generating unit, wherein the front image is added to the information for determining real-time traffic rule; and the step of determining if the information for determining real-time traffic rule conflicts with the navigation route or makes the navigation route not the quickest route comprises:

capturing and identifying a traffic-rule sign from the front image of the information for determining real-time traffic rule utilizing the processing unit; and determining if the traffic-rule sign conflicts with the navigation route or makes the navigation route not the quickest route utilizing the processing unit.

8. The real-time navigation method based on determining current traffic rule information of claim 7, wherein the step of determining if the traffic-rule sign conflicts with the navigation route or makes the navigation route not the quickest route comprises:

determining if there is the traffic-rule sign among a left-turn prohibition sign, a right-turn prohibition sign, a no u-turn sign, a road work ahead sign, a traffic accident sign, a vehicle type restricted sign, a sign representing that there is a train crossing, or a one-way sign utilizing the processing unit.

9. The real-time navigation method based on determining current traffic rule information of claim 6, wherein:

the step of generating the information for determining real-time traffic rule comprises:

receiving a voice signal to be taken as the information for determining real-time traffic rule, wherein the voice signal is received through a microphone of the information detecting-and-generating unit; and the step of determining if the information for determining real-time traffic rule conflicts with the navigation route or makes the navigation route not the quickest route comprises:

identifying a voice instruction according to the voice signal utilizing the processing unit; and determining if the voice instruction conflicts with the navigation route or makes the navigation route not the quickest route utilizing the processing unit.

10. The real-time navigation method based on determining current traffic rule information of claim 6, wherein the step of generating the information for determining real-time traffic rule comprises:

receiving and generating the information for determining real-time traffic rule through a wireless communication interface utilizing a wireless communication module of the information detecting-and-generating unit.

11. The real-time navigation method based on determining current traffic rule information of claim 6 further comprising:

transmitting the information for determining real-time traffic rule through a wireless communication interface utilizing a wireless communication module when the information for determining real-time traffic rule conflicts with the navigation route or makes the navigation route not the quickest route.

12. A non-transitory computer readable storage medium with a computer program to execute a real-time navigation method based on determining current traffic rule information, wherein the real-time navigation method based on determining current traffic rule information comprises:

receiving a destination utilizing a processing unit;

obtaining a present position utilizing the processing unit;

generating a navigation route according to the destination and the present position utilizing the processing unit, wherein the navigation route is generated by searching preset information for determining traffic rule stored in a storage unit according to the destination and the present position to generate;

detecting and generating the information for determining real-time traffic rule utilizing an information detecting-and-generating unit;

determining if the information for determining real-time traffic rule conflicts with the navigation route or makes the navigation route not the quickest route utilizing the processing unit;

re-generating the navigation route according to the destination, the present position and the information for determining real-time traffic rule utilizing the processing unit when the information for determining real-time traffic rule conflicts with the navigation route or makes the navigation route not the quickest route;

outputting the navigation route utilizing the processing unit; and updating the preset information for determining traffic rule in the storage unit according to the information for determining real-time traffic rule utilizing the processing unit when the information for determining real-time traffic rule conflicts with the navigation route or makes the navigation route not the quickest route, wherein the step of updating the preset information for determining traffic rule in the storage unit comprises:

determining if the information for determining real-time traffic rule represents a temporary road situation utilizing the processing unit;

updating the preset information for determining traffic rule in the storage unit according to the information for determining real-time traffic rule utilizing the processing unit when the information for determining real-time traffic rule does not represent the temporary road situation; and stopping updating the preset information for determining traffic rule in the storage unit according to the information for determining real-time traffic rule utilizing the processing unit when the information for determining real-time traffic rule represents the temporary road situation.

* * * * *